United States Patent [19]

Rose

[11] 4,168,457

[45] Sep. 18, 1979

[54] SELF ADAPTIVE SPEED CONTROL SYSTEM

[75] Inventor: Andrew M. Rose, Mountain View, Calif.

[73] Assignee: Sperry Rand Corporation, New York, N.Y.

[21] Appl. No.: 865,472

[22] Filed: Dec. 29, 1977

[51] Int. Cl.² ............................................. G05B 13/00
[52] U.S. Cl. .................................. 318/561; 318/632; 318/326; 318/327; 318/328; 360/78
[58] Field of Search ............... 318/561, 632, 326, 327, 318/328; 360/78

[56] References Cited

U.S. PATENT DOCUMENTS 4,133,011  1/1979  Kurzweil, Jr. .................. 318/561

Primary Examiner—Gene Z. Rubinson
Assistant Examiner—Eugene S. Indyk
Attorney, Agent, or Firm—Eugene T. Battjer

[57] ABSTRACT

Apparatus for controlling the velocity of a moveable load, such as the magnetic head assembly of a disk drive, comprising means for providing velocity command and velocity feedback signals which are combined to produce a velocity control signal for moving the load at desired velocity and additional means including an integrator and sample and hold circuit for detecting error in the feedback signal and varying the command signal to compensate for such error so that the load is controlled to move at the desired velocity.

7 Claims, 9 Drawing Figures

SELF ADAPTIVE SPEED CONTROL SYSTEM

BACKGROUND OF THE INVENTION

1. Field of Invention

This invention relates to self adaptive speed control apparatus which is particularly useful in magnetic disk drive data storage devices of the kind now commonly used in electronic data processing systems and is described herein with reference to such a device.

2. Description of Prior Art

As is well known to those skilled in the art, a disk drive typically comprises a disk pack consisting of a plurality of magnetic recording disks each having a multiplicity of concentric recording tracks and being mounted on a drive spindle in stacked slightly spaced relation to one another for common rotation about the spindle. The disk drive further comprises an array of magnetic heads disposed in read/write relation with the disks. In the case of moveable head drives, the heads are mounted on an actuator driven carriage mechanism with at least one head operatively associated with each magnetic surface. In such drives the heads are usually moved substantially radially of the disks to access a desired track on any disk. For the purpose of minimizing the acess time during the seek operation the heads must be moved as rapidly as possible from a present position to a desired position without overrunning the desired position. This requires that the velocity of the heads be closely regulated, which can be accomplished by monitoring the velocity of the heads with an electronic tachometer.

In some earlier disk drives, a tachometer velocity indication was provided by differentiating a signal representative of change of position or distance traveled by the heads. The head travel signal was obtained by means of apparatus which included an optical grating mounted for movement with the carriage mechanism and operating in combination with a light source and associated light detector fixedly positioned to each side of the grating. As the grating moved with the carriage mechanism the light passing through the grating was modulated and the distance traveled by the heads determined by detecting the modulated light, thereby providing an accurate indication of head position relative to the tracks on the disks. An example of such a head positioning system is disclosed in U.S. Pat. No. 3,597,750, Servo with AGC for Positioning a Magnetic Head, issued Aug. 3, 1971. While the velocity signal obtained with this system was accurate, unfortunately it was not continuous.

A continuous indication of head velocity has been provided by apparatus of the type disclosed in U.S. Pat. No. 3,568,059, Electronic Tachometer, issued Mar. 2, 1971 wherein the velocity indication is obtained by integrating a signal representative of the current applied to the actuator which drives the carriage mechanism. It was recognized, however, that the actuator drive current was not totally accurate for indicating head velocity because of variations in wind resistance and friction associated with the carriage mechanism and other such factors. Therefore, the velocity signal obtained by integration of the actuator current had to be corrected periodically in order to obtain an accurate indication of head velocity. Such correction was provided by periodically adjusting the continuous actuator derived velocity signal to the value of a discontinuous but accurate velocity signal obtained by differentiation of a distance signal derived from an optical grating.

Other electronic tachometers incorporating optical grating apparatus for providing position information and velocity information derived by differentiation of the position information are known in the art and capable of providing an accurate and continuous velocity indication. A tachometer of this type is disclosed in U.S. Pat. No. 3,811,091, issued May 14, 1974. In any event, in presently used disk drives the optical grating has been eliminated by the provision of position control servo data recorded directly on the magnetic disks. This reduces the cost of the disk drive and facilitates interchanging of the disk packs without concern for extremely precise positioning of the pack, as is required with a grating apparatus, because the position of the heads is referenced directly to the disks. Position control by use of such servo data may be achieved, for example, by a servo head which is operatively associated with one of the magnetic surfaces and affixed to the carriage mechanism to move in unison with data heads associated with the other magnetic surfaces of the disk pack. As the actuator mechanism moves the array of ganged heads in unison across the disk surfaces, the servo head responds to the servo data to produce a change of position or distance signal which is used for controlling the motion of the heads to locate a selected head adjacent a desired track of its associated disk. This distance signal, however, is not as accurate as the distance signal provided by a grating system and as a result a velocity signal derived therefrom is not accurate to the degree desired for high track density disk drives. More specifically, the distance signal obtained by detecting recorded servo data is usually truncated in shape or otherwise distorted so as not to have a constant amplitude, much less a predictable waveform. Since the velocity signal is generated by differentiating the distance signal, any change in the shape of such signal results in a change in its slope and thus provides an erroneous velocity signal. Changes in the slope of the distance signal can be caused, among other things, by variations in the amplitude of the recorded servo signal, variations in the coercivity of the magnetic recording surface and variations in the head flying height relative to the magnetic surface.

The accuracy of the velocity signal is also affected by defects in the recording media and by the wider bandwidth and higher slew rate required of the distance detecting and differentiating circuits used in high track density devices. Media defects, for instance, produce noise in the detected distance signal and in the case of high track densities may result in complete obliteration of certain tracks with a resultant substantial increase in noise and degradation of signal to noise ratio. Moreover, media defects adversely affect a velocity signal obtained by differentiation of a distance signal derived from recorded servo data because such defects are characterized by high frequency components which are accentuated by the differentiation process. The slew rate and bandwidth of the differentiator circuit have a deleterious affect on the signal to noise ratio in high track density devices because the frequency of the distance signal obtained by detection of the servo data is proportional to the rate at which the head traverses the tracks which in turn is dependent on the track density.

A more recently developed electronic tachometer and speed control apparatus described in U.S. patent application Ser. No. 854,299, Self Regulating Electronic Tachometer, filed in the names of F. J. Sordello and J. J. Touchton, is capable of providing an accurate indication of head velocity without the need for differentiating a distance signal obtained from recorded servo data and thus overcomes many of the problems attendant to such tachometers. This advantage is obtained by deriving the velocity signal from integration of a signal representative of head acceleration and providing means for integrating the velocity signal to obtain a distance signal which is periodically sampled and compared with a reference signal representative of a known distance increment traversed by the heads. Any difference between the reference signal and the distance signal produces a distance error signal which is used to adjust the velocity signal until the distance signal is made equal to the reference signal whereby the velocity signal accurately represents head velocity.

SUMMARY OF THE INVENTION

The present invention controls the head or load velocity not by providing an accurate tachometer indication of the load velocity as in the case of the aforedescribed prior art systems but rather by detecting when the tachometer velocity indication is in error and then varying a velocity command to the load to compensate for such error.

A conventional velocity control system comprises velocity command means for generating a velocity command signal to move the load, tachometer means for providing a velocity feedback signal representative of the load velocity and means for comparing the command and feedback signals to produce a signal for controlling the velocity of the load. In accordance with the principles of the present invention, error in the tachometer indication is detected by means of an integrator coupled to receive the tachometer velocity signal for producing a distance signal representative of distance traveled by the load during a time interval in which the load traverses a known distance which is represented by a reference signal. Deviation of the distance signal from the reference signal value is indicative of error in the tachometer signal and a signal representative of such deviation serves to vary the velocity command signal in a manner to compensate for the erroneous tachometer indication, thereby precluding error in the signal produced by comparison of the velocity command and tachometer feedback signals and assuring that the load moves at desired velocity. The error compensation is provided on a recurrent sample basis by utilization of distance marker signals which indicate fixed positions along the load path of travel. At the occurrence of each distance marker signal, the integrator is reset to a reference value and the tachometer velocity signal is then integrated over an interval to the occurrence of the next distance marker signal. The distance signal provided at the output of the integrator is sampled at the end of each such interval and held for the duration of the immediately following interval. Each sampled distance signal is used to regulate the velocity command signal in accordance with the deviation of the sampled distance signal from the reference signal value representative of the distance corresponding to the integration interval. Thus, although the sampling may be performed at a variable rate in accordance with the velocity of the load, the tachometer velocity signal will always be integrated over a known distance which serves as a reference to which the integrator distance is compared.

DESCRIPTION OF THE INVENTION

Figure 1:
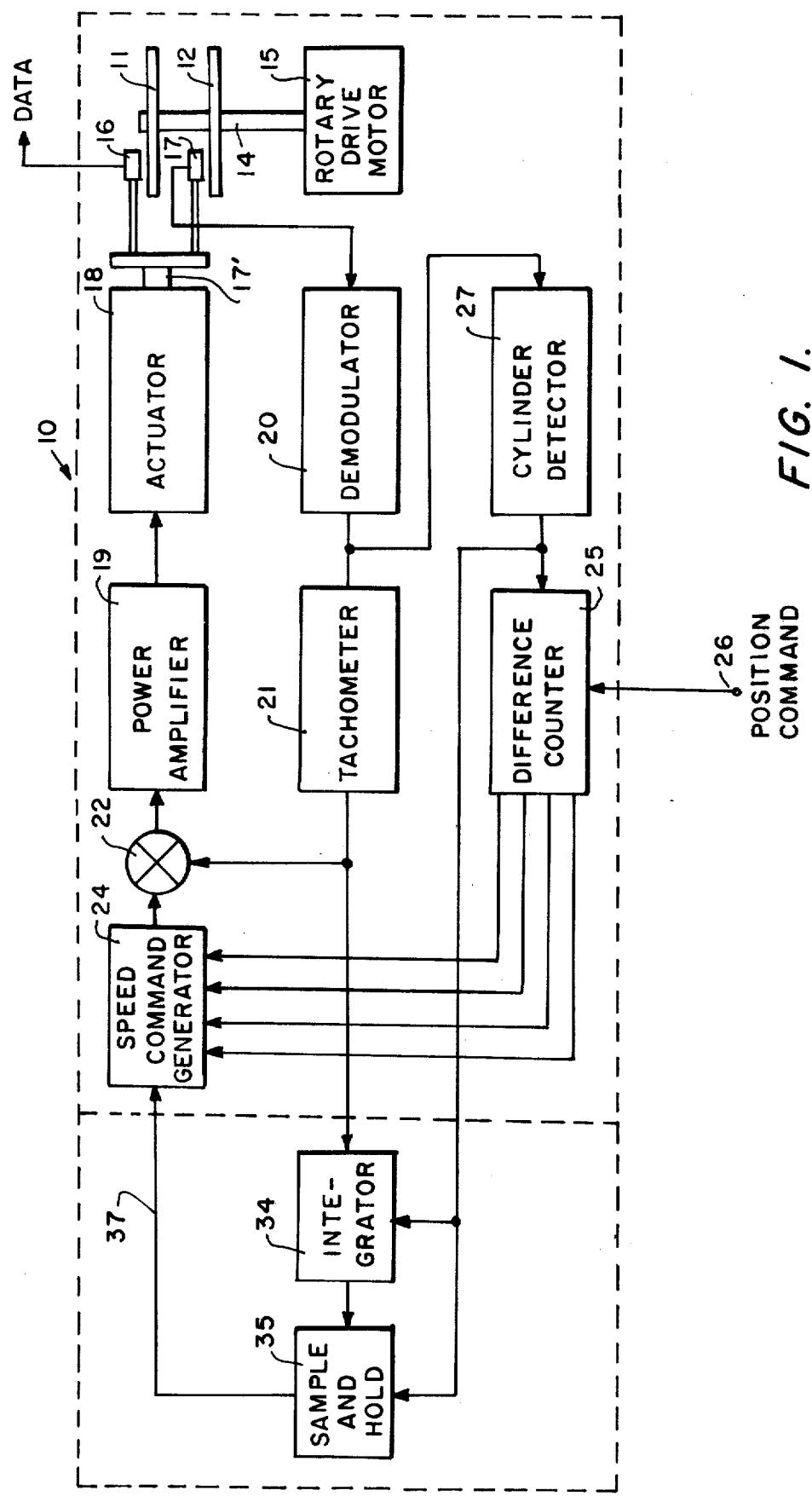
FIG. 1 is a block diagram of a preferred embodiment of the invention.

FIG. 1 depicts a computer system disk drive 10 in which the present invention is particularly useful. The disk drive comprises a pair of magnetically coated recording disks 11 and 12 each having a multiplicity of concentrically disposed data recording tracks and being mounted on a shaft 14 which is driven by a rotary drive motor 15. Magnetic read/write heads 16 and 17 are operatively associated with disks 11 and 12 respectively for recording or reading data on the disk tracks. As the disks are rotated a carriage 17', on which the heads are mounted, is moved radially of the disks by actuator 18 to position the heads adjacent particular data tracks. Actuator 18 is energized by power amplifier 19 to move and stop the heads in unison at any track on the disk surfaces. Disk 12 and head 17 function as part of a servo mechanism for controlling the position of the head 16 relative to disk 11 on which data is to be read or recorded. A typical drive usually comprises a plurality of data disks (11), and associated heads (16), arranged in a stack on shaft 14 such that corresponding data tracks of all the data disks are disposed one above the other in cylindrical fashion. In operation of the drive, servo data detected by head 17 is applied to demodulator 20, which may be of the type described in U.S. patent application Ser. No. 713,133, Dual Mode Demodulator, filed Aug. 10, 1976 and assigned to the Sperry Rand Corporation. In a coarse position mode, when the heads are being moved radially across the disks to position a selected head adjacent a particular track on one of the data disks, the demodulator serves to provide a change of position signal indicative of head travel. When the heads have been positioned such that the selected head is adjacent a desired track, the drive operates in a fine position mode in which the demodulator serves to generate a fine position signal indicative of the amount and direction of displacement of the head from the desired track.

The present invention relates to the coarse position mode of operation for the purpose of accurately and rapidly positioning a selected head proximate a desired track. This is accomplished in the illustrated embodiment by applying the change of position signal provided at the output of demodulator 20 to a trachometer 21 which differentiates the distance signal to produce a tachometer velocity signal indicative of head velocity. The tachometer velocity signal is fed to summing junction 22 where it is algebraically combined as a feedback signal with a velocity command signal supplied from speed command generator 24. The signal provided at the output of the summing junction is representative of any difference between the command and tachometer velocity signals and is applied to power amplifier 19 to control the velocity of the heads. Speed command generator 24 provides a velocity command signal representative of the optimum velocity at which the heads should be moved so as to reach a desired track in the shortest time interval without overrunning the track.

During a seek or accessing operation when the heads are moving from a present position to a desired track position, velocity command signal amplitude is regulated to achieve the desired motion of the heads, as is known in the art, in accordance with the instantaneous distance between the instantaneous head position and the desired track position. This instantaneous distance is represented by a digital signal which is produced at the output of difference counter 25 in response to a position command signal applied to terminal 26 and a track crossing signal supplied from cylinder detector 27 which is coupled to the output of demodulator 20. The position command signal indicates the track to which the heads are to be moved and the track crossing signal indicates each track or cylinder that the heads traverse in the course of moving to the desired track. The instantaneous distance signal out of difference counter 25 acts in speed command generator 24, which may be of the type disclosed in U.S. Pat. No. 3,826,927, Smooth Wave Electrical Generator, issued July 30, 1974, to produce the velocity command signal.

As explained hereinbefore error can occur in the tachometer velocity signal. In the case of tachometer 21, for instance, where the velocity signal is produced by differentiation of the head travel signal supplied from demodulator 20 it will be appreciated that any changes in the head travel signal amplitude, which are unrelated to actual head travel, will be accompanied by changes in slope of the head travel signal and thus produce an erroneous indication of head velocity. As a result, when the tachometer velocity signal is combined in summing junction 22 with the velocity command signal from speed command generator 24, an incorrect signal can be applied to power amplifier 19 and cause the heads to move an improper velocity. If the tachometer velocity signal is too low, for example, the actuator will be caused to move too fast and possibly overrun the desired track position. On the other hand, if the tachometer velocity signal is too high, the actuator will be caused to move too slowly and thereby increase the access time. It is therefore important that any error in the indicated velocity signal of the tachometer be detected and compensated for to achieve proper actuation of the head carriage mechanism.

Figure 2A:
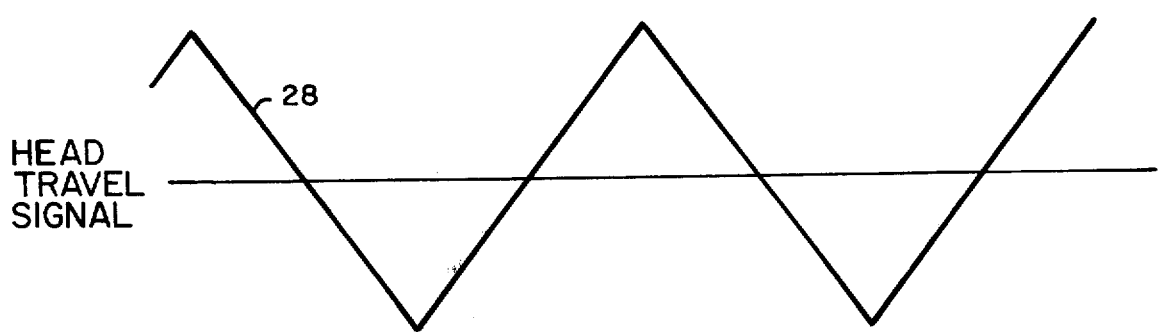
FIGS. 2A through 2G depict various waveforms which are useful for explaining the operation of the preferred embodiment shown in FIG. 1.
Figure 2B:
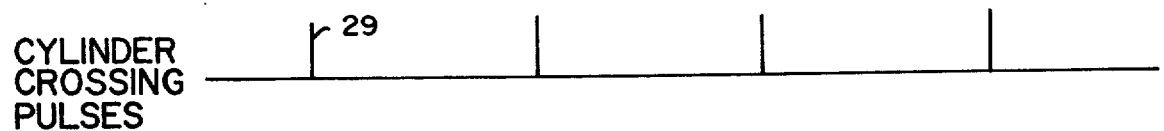
Figure 2C:
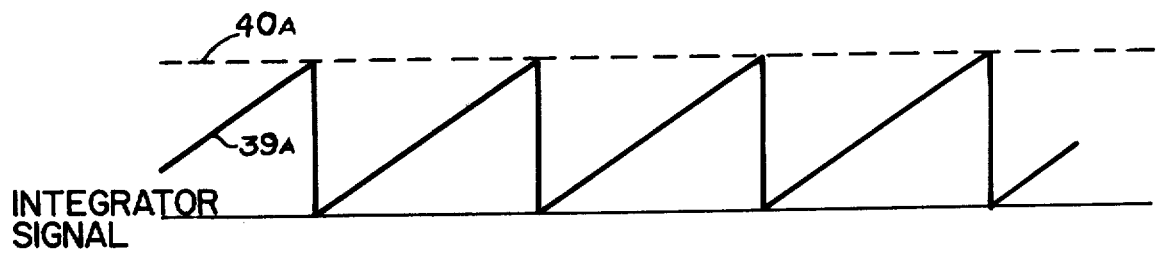

Correction for error in the tachometer velocity signal in accordance with the principles of the present invention is provided by means of integrator 34 and sample and hold 35 which act periodically to adjust the velocity command signal so as to move the heads at optimum velocity notwithstanding the tachometer velocity error. The manner in which this is accomplised will be understood more fully by reference to the waveforms of FIGS. 2A through 2G. FIG. 2A depicts an ideal head travel or change of position signal 28 produced at the output of demodulator 20. This ideal head travel signal, when differentiated in tachometer 21, produces an accurate signal indication of head velocity at the tachometer output. FIG. 2B illustrates track crossing or cylinder crossing pulses 29 produced at the output of cylinder detector 27. It will be noted that the cylinder crossing pulses 29 are aligned with the zero crossing points of head travel signal 28. During a seek operation, the cylinder crossing pulses supplied from cylinder detector 27 to difference counter 25 are also applied to integrator 34 and sample and hold 35. Application of a cylinder crossing pulse to integrator 34 causes the integrator to reset to its zero or reference value in readiness for integrating the tachometer output signal from that instant until the occurrence of the next cylinder crossing pulse. Application of the cylinder crossing pulse to sample and hold 35 causes the integrator output to be sampled immediately prior to being reset and the sampled value to be held until the next sampling instant which occurs at the following cylinder crossing. Construction of the integrator or other means for introducing the slight delay needed to assure sampling prior to resetting of the integrator is well known to those skilled in the art. FIG. 2C depicts the integrator output (distance) signal 39A corresponding to the ideal head travel signal 28 of FIG. 2A. It is seen that the distance signal reaches an amplitude value designated by dashed line 40A before being reset to zero at the occurrence of each cylinder crossing pulse. Amplitude value 40A of the distance signal is the sampled value and corresponds to a value which represents the actual distance traversed by the heads in moving from the center of one cylinder to the center of the next cylinder. This sampled value thus has no affect on speed command generator 24 as indeed is desired when tachometer 21 is accurately indicating head velocity.

Figure 2D:
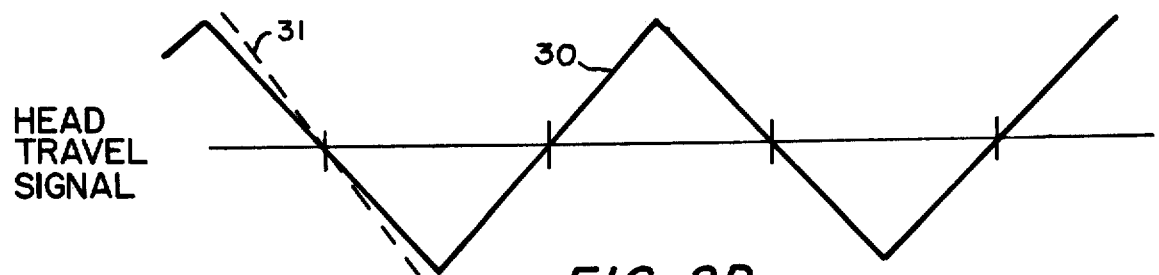
Figure 2E:
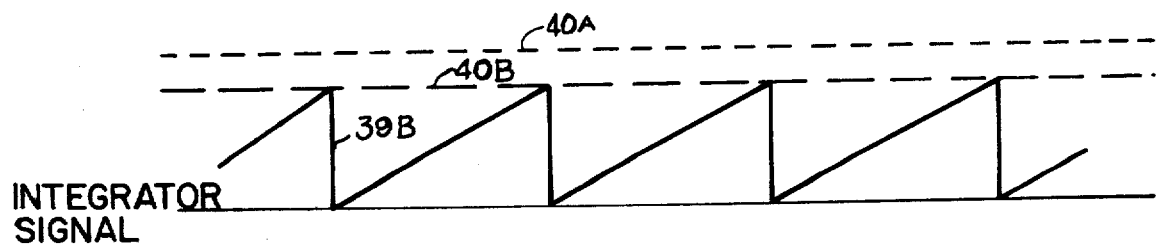

Now consider the operation of the system where the heads are moving at the correct velocity but the head travel signal provided at the output of demodulator 20 has an erroneous amplitude and slope. FIG. 2D illustrates the case where the amplitude and slope of the head travel signal 30 are less than the correct value designated by dashed line 31. Note that the axis crossing points are still aligned with the cylinder crossings, indicating that the heads are traveling at the same velocity as in the case of waveform 28 of FIG. 2A. The response of tachometer 21 to signal 30 will result in a tachometer velocity signal indicating that the heads are moving slower than their actual velocity. Integration of this erroneous velocity signal produces an integrator output (distance) signal 39B as shown in FIG. 2E where it is seen that at the cylinder crossing points, the distance signal has not reached the amplitude value 40A but in fact has risen only to the value designated by dashed line 40B. As a result, the sampled distance signal amplitude value 40B supplied from sample and hold 35 via lead 37 to speed command generator 24 will act to change the velocity command signal so that no signal is produced at the output of summing junction 22 in response to the erroneous tachometer velocity indication.

Figure 2F:
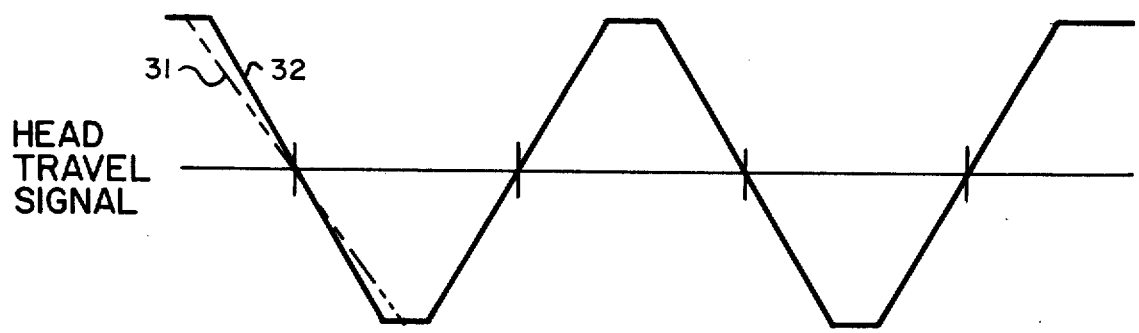
Figure 2G:
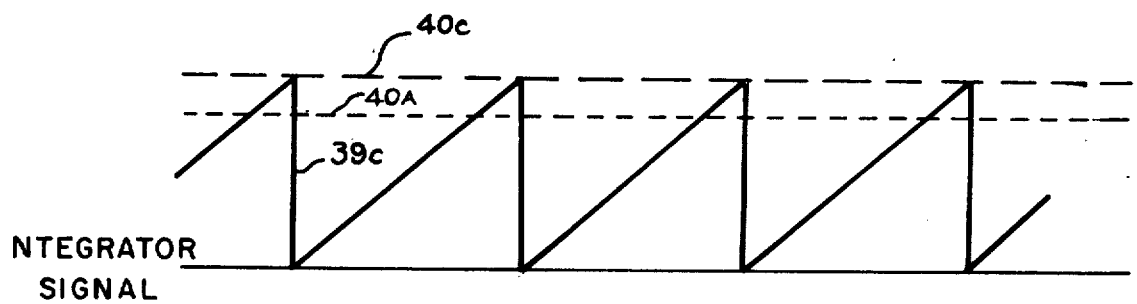

The operation of the system in the case where the heads are moving at the correct velocity but the head travel signal has a slope greater than what it should be is illustrated by the waveforms of FIGS. 2F and 2G. The axis crossing points of head travel signal 32 occur at the cylinder crossing points as in the case of FIGS. 2A and 2D but the slope of signal 32 is greater than the correct value indicated by dashed line 31. Tachometer 21 will respond to head travel signal 32 to produce a velocity signal indicating that the heads are moving faster than their velocity. Integrator 34 responds to such a velocity signal to produce an integrator output (distance) signal 39C as shown in FIG. 2G where it is seen that the distance signal level at the cylinder crossing points reaches a value designated by dashed line 40C exceeding the amplitude value 40A. This sampled distance signal amplitude value 40C acts on speed command generator 24 to increase the velocity command signal so that again no signal is produced at the output of summing junction 22 in response to the erroneous tachometer velocity signal.

From the foregoing description it will be appreciated that the heads are caused to move at the correct velocity irrespective of errors in the tachometer velocity indication. In summary, this is accomplished by the provision of means for integrating the tachometer velocity signal to obtain a distance signal which is periodically sampled. The sampled distance signal is calibrated to a reference signal level representative of actual distance traversed by the head in the interval between samples. When the tachometer velocity signal accurately indicates the actual velocity of the heads no adjustment is made in the velocity command signal provided by the speed command generator. If the tachometer velocity signal is not accurately representative of head velocity, however, the velocity command signal is adjusted as necessary to compensate for the error in the tachometer signal to assure that the actual head velocity is not changed.

Figure 3:
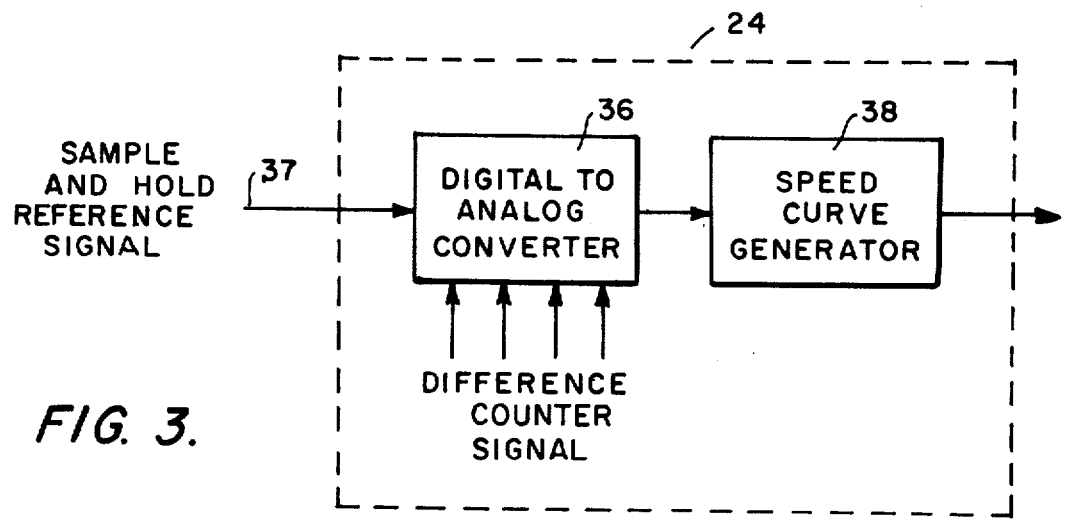
FIG. 3 is a block diagram of the speed command generator incorporated in the preferred embodiment.

The manner of adjusting the velocity command signal will be more fully understood by reference to FIG. 3 which illustrates the speed command generator as comprising digital to analog converter 36, for example, a Motorola MC1408A multiplying converter, which is coupled to receive a digital difference counter signal from difference counter 25 and a reference input from sample and hold 35. The output of digital to analog converter 36 is coupled to speed curve generator 38 which supplies the velocity command signal at its output for application to summing junction 22. The digital difference counter signal represents the distance increment between the instantaneous position of the head and the desired position to which the head is to move. When the tachometer velocity signal is correct the sample and hold reference signal input to the converter is at a nominal value and converter 36 supplies an instantaneous nominal signal to speed curve generator 38. If the tachometer velocity signal is in error, the sample and hold reference signal deviates from its nominal value and the signal out of converter 36 likewise varies to adjust the velocity command signal out of speed curve generator 38 as necessary to provide the desired compensation.

While a preferred embodiment of the invention has been described in specific detail, it will be understood that various modifications and substitutions may be made therein without departing from the spirit and scope of the invention as defined in the appended claims.

I claim:

1. In apparatus for controlling the velocity of an actuator driven load which includes velocity command means for providing a velocity command signal, tachometer means coupled to the load for providing a tachometer signal indicative of the load velocity, and means for combining the velocity command signal and the tachometer signal to produce a signal for application to the actuator to control the load to move at desired velocity, the improvement comprising:

integrator means coupled to integrate the tachometer signal for producing a distance signal which is indicative of error in the tachometer signal in accordance with deviation of the distance signal from a reference signal value representative of actual distance traversed by the load during an integration interval, and means coupling the output of said integrator means to said velocity command means to apply to said velocity command means a signal derived from said integrator means for varying the velocity command signal so as to compensate for error in the tachometer signal whereby the load is controlled to move at desired velocity irrespective of the error in the tachometer signal.

2. The apparatus of claim 1 wherein the load is controlled to move from a present position to a desired position and the velocity command means includes means for providing a difference signal representative of the difference between the instantaneous and desired load positions and means responsive to the difference signal and the signal derived from the integrator means for varying the velocity command signal.

3. The apparatus of claim 2 further including means for generating distance marker signals indicative of discrete positions traversed by the load and wherein the means for providing a difference signal is responsive to a signal representative of the desired position to which the load is to move and to the distance marker signals for decrementing the difference signal as the load moves from a starting position to the desired position.

4. The apparatus of claim 1 wherein the means coupling the output of the integrator means to the velocity command means comprises a sample and hold circuit for recurrently sampling the distance signal and each sampled value of the distance signal is indicative of error in the tachometer signal in accordance with deviation of a sampled value from a reference signal value representative of actual distance traversed by the load between successive samples.

5. The apparatus of claim 4 further including means coupled to the load for generating distance marker signals each indicative of a discrete position traversed by the load and operative to actuate the sample and hold circuit for sampling the distance signal and to reset the integration means to a reference value.

6. The apparatus of claim 4 wherein the load is controlled to move from a present position to a desired position and the velocity command means includes means for providing a difference signal representative of the difference between the instantaneous and desired load positions and means responsive to the difference signal and the signal derived from the integrator means for varying the velocity command signal.

7. The apparatus of claim 6 further including means coupled to the load for generating distance marker signals each indicative of a discrete position traversed by the load and operative to actuate the sample and hold circuit for sampling the distance signal and to reset the integration means to a reference value.

* * * * *